Sept. 27, 1966     F. RIEBER, JR     3,275,078
METHOD FOR DISPLACEMENT OF FLUIDS
IN UNDERGROUND STORAGE OF GASES
Filed July 29, 1963
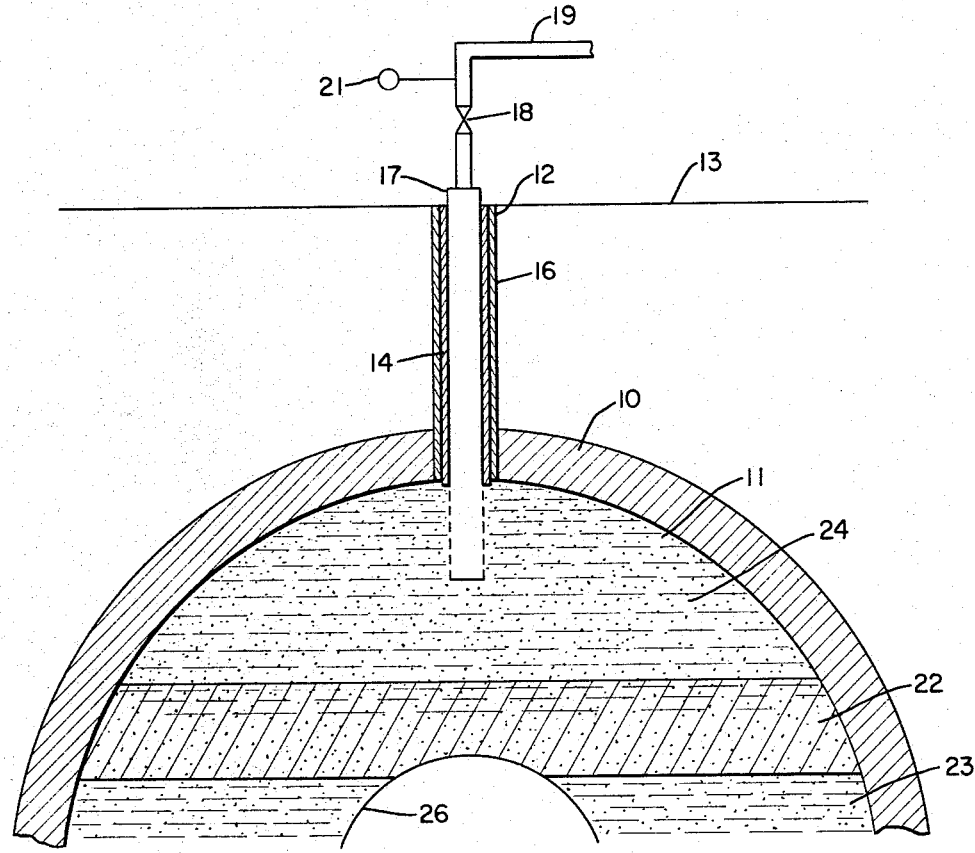
INVENTOR.
FRANK RIEBER, JR.
BY
*Sheridan and Ross*
ATTORNEYS

United States Patent Office 3,275,078
Patented Sept. 27, 1966

3,275,078
METHOD FOR DISPLACEMENT OF FLUIDS IN UNDERGROUND STORAGE OF GASES
Frank Rieber, Jr., Littleton, Colo., assignor to Interstate Service Corporation, doing business as Ball Associates Ltd., Denver, Colo., a corporation of Maryland
Filed July 29, 1963, Ser. No. 298,355
3 Claims. (Cl. 166—42)

This invention relates to an efficient method for the displacement of underground reservoir fluids in connection with the underground storage of gases and liquefied gases, and particularly to the production of underground storage space for hydrocarbon gases and liquefied hydrocarbon gases in porous formations.

Natural gas, propane, and liquefied petroleum gas, both in the vapor phase and in the liquid phase, have been injected for storage purposes into porous earth formations to displace therefrom absorbed oil, water or gas and water. The displacement efficiency of such prior art methods, however, has not approached 100 percent, as witnessed by the fact that large percentages of the absorbed fluid being displaced remained trapped in the porous formations. When such prior art displacement methods are used to produce underground storage space in porous sand formations, their efficiency suffers from the fact that the absorbed fluid is not completely displaced. As a result, a smaller volume of storage space is made available for the fluid to be stored underground.

Accordingly, it is an important object of this invention to provide an efficient method for the displacement of underground fluids from porous formations to produce a maximum volume of storage space for underground storage of fluids.

Another object of this invention is to provide a method approaching 100 percent efficiency for the underground displacement of water from porous formations to produce a maximum volume of storage space for the underground storage of hydrocarbon fluids.

Additional objects of this invention will become available from the following description, which is given primarily for purposes of illustration, and not limitation.

Stated in general terms, the objects of the invention are attained by providing an underground storage method which comprises displacing absorbed fluid, such as water, gas and water, oil, etc., from underground absorbent formations, such as porous formations, porous sands, etc., by injecting into the formation a displacing liquid, under pressure, which is miscible both with the absorbed fluid to be displaced and the fluid to be stored underground to minimize displacement inefficiencies due to an interface between the absorbed, underground fluid being displaced and the displacing liquid being injected into the formation. By eliminating the interfaces between the displacing liquid and the displaced fluids, a minimum amount of displaced fluids remains on the formation and a maximum volume of storage space for fluids to be stored underground is provided. The fluid to be stored is injected into the formation, following the injection of the desired amount of displacing liquid, until the desired amount of fluid has been placed in storage.

A more detailed description of a specific embodiment of the invention is given below with reference to the accompanying drawing, which is a vertical sectional view schematically showing an underground dome formation.

The dome formation 10 is practically impervious to natural gas, liquefied petroleum gas, water, brine, water and gas, etc. Enclosed in the dome formation 10, is a volume of sand formation 11. The sand formation 11 is porous and contains absorbed underground water at active aquifer pressure.

A hole 12 is drilled from the surface 13 of the earth down through the dome formation 10, as shown. A length of casing 14 is cemented in hole 12, as indicated at 16. A length of tubing 17 is introduced into casing 16. The upper end of tubing 17 is connected to a valve 18 which, in turn, is connected to storage fluid line 19. A displacement fluid detector 21 is connected to line 19.

The desired amount of miscible displacing liquid is pumped into line 19, by the use of auxiliary equipment, not shown, until detector 21 shows that the passage of displacing liquid in line 19 has ceased. The displacing liquid, as it is pumped through valve 18 and down through tubing 17, passes into the top portion of sand formation 11 enclosed inside dome formation 10. As the displacing liquid enters sand formation 11 it displaces the absorbed underground water from the particles of sand and spreads out to form a layer of miscible displacing liquid.

After the miscible displacing liquid has been pumped into sand formation 11, the storage fluid is pumped through line 19, valve 18 and tubing 17 into sand formation 11. As the storage fluid is pumped into sand formation 11, on top of the layer 22 of miscible displacing liquid, the layer 22 moves downwardly inside dome formation 10, pushing absorbed water in zone 23, at active aquifer pressure, downwardly ahead of itself, and a zone 24 of storage fluid forms above the layer 22 of displacing liquid. This process continues as more storage fluid is introduced through line 19 into the sand formation 11 inside dome formation 10. Layer 22 of miscible displacing liquid continues to move downwardly in dome formation 10 and the volume of storage space in sand formation 11 becomes larger and larger until all of the storage fluid has been introduced into the sand formation.

The water is displaced from the sand formation with substantially 100 percent efficiency because the interfaces between the displacing liquid in layer 22 and the displaced water on the sand are continuously eliminated in the pores or interstices of the sand formation as layer 22 pushes the water off the sand formation. Some solution of the displacing liquid in water takes place as layer 22 of miscible displacing liquid moves downwardly inside dome formation 10. However, because of the absence of mixing and the slowness of the diffusion process, the interfaces are continuously eliminated between the displacing liquid, and the water without complete solution of the miscible displacing liquid in the water.

When it is desired to withdraw some stored fluid from sand formation 11, the above-described process is reversed. Valve 18 is opened and stored fluid is withdrawn from storage through tubing 17, valve 18 and line 19 to an above-ground storage tank or reservoir for consumption. The active aquifer pressure exerted upon the stored fluid in sand formation 11 by the water in zone 23, through miscible displacing liquid layer 22 pushes the stored fluid out of storage in dome formation 10 through line 19. As storage fluid is withdrawn from sand formation 11, the displacing liquid layer 22 moves upwardly under the aquifer pressure of zone 23. During such movement the miscible displacing liquid in layer 22 displaces the stored fluid with substantially 100 percent efficiency because the interfaces between the miscible displacing liquid in layer 22 and the stored fluid in sand formation 11 are continuously eliminated in the pores or interstices of the sand formation 11 as the water in zone 23 pushes the stored fluid off the sand formation 11. Displacement fluid detector 21 gives an indication when all of the stored fluid has been withdrawn.

The dome 26 indicates a rock formation which may occur inside dome formation 10. It will be understood that various types of rock formations, salt formations, sulfur formations, and the like, differing in various respects from the dome formation 10, can be used to practice the method of the invention. Also, more than one tubing 17 can be sunk through dome formation 10, or any other type of geological formation employed. One tubing can be used to introduce or withdraw miscible displacing liquid, and another tubing can be used to introduce or withdraw stored fluid. A third tubing can be sunk and used to introduce water, brine, water and gas, oil, and the like into the zone equivalent to zone 23 described hereinabove, if desired.

The storage fluid can be either a gas, vapor, liquefied gas or liquid such as methane, ethane, ethylene, liquid or gaseous propane, propylene, butane, butylene, pentanes, hexanes, benzene, toluene, or similar hydrocarbons or mixtures of hydrocarbons, gaseous and liquid, such as natural gas, petroleum refinery gas, fuel gas, utility gas, city gas, liquefied petroleum gas, casinghead gas, naphtha, petroleum ether, and the like. The miscible displacing liquid chosen in a given situation will depend upon the fluid to be stored and upon the underground fluid absorbed in the porous formation because the displacing liquid is miscible, or at least partially miscible with both the fluid to be stored and the underground fluid in the formation to be used for storage purposes. In general, the cheaper, commercial grades of liquid alcohols, glycol, polyols, fuel oils, mixtures of acolohols, alcohol wastes, sugar wastes, amines, mercaptans, and the like, may be used as miscible displacing liquids. Some examples of miscible displacing liquids that can be used are methanol, ethanol, propanol, isopropanol, butanol, pentanol, hexanol, glycerol, ethylene glycol, polyethylene glycol, propylene glycol, polypropylene glycol and other liquid polyols, as well as mixtures of these liquids. Some liquefied gases also can be used in some situations, such as liquefied carbon dioxide, liquefied sulfur dioxide, liquefied ammonia, and the like.

The following are examples of operable combinations of storage material, miscible displacement material and displaced fluid; methane stored in a reservoir originally containing water with, methanol, propanol or liquid $CO_2$ used as the miscible fluid; liquid or vapor propane stored in a reservoir originally containing water methanol or propanol used as the displacing fluid; methane vapor stored in a reservoir originally containing water oil and gas with propanol used as the miscible displacing fluid; and liquid propane stored in a reservoir originally containing oil, gas and water with propanol used as the displacing fluid.

Obviously, many other modifications and variations of the present invention are possible in the light of the teachings given hereinabove. It is, therefore, to be understood that, within the scope of the appended claims, the invention can be practiced otherwise than as specifically described.

What is claimed is:

1. A method for underground storage of fluids which comprises the steps of: introducing into a confining geological formation, containing an absorbed underground fluid, a displacing liquid which is at least partially miscible, both with the fluid to be stored and the absorbed underground fluid; introducing the liquid to be stored into the confining geological formation; forming a layer of the displacing liquid between the zone of absorbed underground fluid and the zone of storage fluid; applying pressure to the zone of storage fluid to push the layer of displacing liquid downwardly for displacing the underground fluid from the formation and expanding the storage space above the layer of displacing liquid; and introducing the storage fluid into the storage space thus formed for storage therein.

2. A method for underground storage of hydrocarbon fluids which comprises the steps of: introducing into a porous formation in a geological formation containing an underground fluid an alcohol-containing displacing liquid which is at least partially miscible both with the hydrocarbon fluid to be stored and the underground fluids; introducing the hydrocarbon fluid to be stored into the geological formation; forming a layer of the alcohol-containing liquid between the zone of the underground fluid and the zone of the hydrocarbon fluid; applying pressure to the zone of the hydrocarbon fluid to push the layer of the alcohol-containing liquid downwardly for displacing the underground fluid from the porous formation and expanding the storage space above the layer of the alcohol-containing liquid; and introducing the hydrocarbon storage fluid into the storage space thus formed for storage therein.

3. A method for underground storage of gaseous hydrocarbons which comprises the steps of: introducing into a sand formation inside a dome formation containing underground water an alcohol-containing displacing liquid which is at least partially miscible both with the gaseous hydrocarbons to be stored and the underground water; introducing the gaseous hydrocarbons to be stored into the sand formation inside the dome formation; forming a layer of the alcohol-containing displacing liquid between the zone of the underground water and the zone of the gaseous hydrocarbons to be stored; applying pressure to the zone of the gaseous hydrocarbons to be stored to push the layer of the alcohol-containing displacing liquid downwardly for displacing the underground water from the sand formation and expanding the storage space inside the dome formation above the layer of the alcohol-containing displacing liquid; and introducing the gaseous hydrocarbons to be stored into the storage space thus formed for storage therein.

References Cited by the Examiner

UNITED STATES PATENTS

| | | | |
|---|---|---|---|
| 2,885,003 | 5/1959 | Lindauer | 166—9 |
| 2,968,350 | 1/1961 | Slobod et al. | 166—9 |
| 3,152,640 | 10/1964 | Marx | 166—42 X |
| 3,175,614 | 3/1965 | Wyllie | 166—42 |

CHARLES E. O'CONNELL, *Primary Examiner.*

S. J. NOVOSAD, *Assistant Examiner.*